(12) United States Patent
Zook et al.

(10) Patent No.: US 6,371,174 B1
(45) Date of Patent: Apr. 16, 2002

(54) ADHESIVE APPLICATION SYSTEM AND METHOD OF USE

(75) Inventors: Jon C. Zook, Hendersonville; J. R. Chapman, Nashville; Dieter Heerdt, Gallatin, all of TN (US)

(73) Assignee: Illinois Tool Works, Inc., Glenview, IL (US)

(*) Notice: Subject to any disclaimer, the term of this patent is extended or adjusted under 35 U.S.C. 154(b) by 0 days.

(21) Appl. No.: 09/768,612

(22) Filed: Jan. 25, 2001

(51) Int. Cl.$^7$ .................................................. B65B 1/04
(52) U.S. Cl. ....................... 141/65; 141/82; 222/146.2; 118/302; 432/13
(58) Field of Search .............................. 141/65, 98, 82; 118/302; 222/146.2; 432/13

(56) References Cited

U.S. PATENT DOCUMENTS

| | | |
|---|---|---|
| 5,632,918 A | 5/1997 | Zook et al. |
| 5,645,743 A | 7/1997 | Zook |
| 5,683,578 A | 11/1997 | Zook et al. |
| 5,806,720 A | 9/1998 | Zook |
| 5,862,841 A * | 1/1999 | Wuester, Sr. |

* cited by examiner

*Primary Examiner*—Steven O. Douglas
(74) *Attorney, Agent, or Firm*—Lowe Hauptman Gilman & Berner, LLP (57) ABSTRACT

An adhesive supply unit for melting solid and quasi/solid materials, such as polyurethane (PUR) and other hot melt adhesives, is disclosed. The unit features an air control system that automatically starts, when the hopper lid is closed, to remove moisture from the moisture laden air in the hopper interior by alternately applying a vacuum to the hopper interior and then replacing the air with plant air that has passed through a series of dryers and filters. The dryers/filters, valving mechanisms and tubing are mounted directly to the machine body with a panel bolted to the machine, eliminating the need for storing the air control system on a separate cart. A sensor verifies that the hopper lid is securely closed before automatically initiating the drying/purging cycles which are repeated a number of times to assure appropriate dehumidification of air to acceptable levels. The control system utilizes a pressure transducer instead of a fixed timer to operate each cycle until predetermined pressure levels are reached. A unique arrangement for securely clamping the hopper lid to the hopper to assure an air tight seal is also disclosed.

8 Claims, 6 Drawing Sheets

ADHESIVE APPLICATION SYSTEM AND METHOD OF USE

TECHNICAL FIELD

The present invention relates generally to adhesive application systems and, more particularly, to systems designed to be used with polyurethane (PUR) and other adhesives that cure by reacting with moisture in ambient air.

BACKGROUND ART

Reactive hot melt adhesive coating machines are commonly used to spray a reactive hot melt adhesive onto an applied object with the use of one or more nozzles. The reactive hot melt adhesive is supplied from an adhesive supply unit having an adhesive supply hopper or storage tank which stores the reactive hot melt adhesive in a molten condition. The molten material is fed through an adhesive heating passage with appropriately pressurized air. An exemplary system is disclosed, for example, in U.S. patent application Ser. No. 09/179,964, filed Oct. 28, 1998, entitled "Reactive Hot Melt Adhesive Coating Machine", assigned to Illinois Tool Works, Inc., Chicago, Ill., the assignee of the present invention. The disclosure of the '964 application is incorporated by reference herein in its entirety.

The adhesive supply unit such as the type described above is also designed to be used with polyurethane (PUR) adhesives. Polyurethane adhesives produce an extremely strong bond and they may be used for structural purposes or for laminates, carpet bonding, etc. They contain no solvents, which makes them environmentally desirable. However, PUR adhesives react to moisture and typically must be melted at temperatures below 300° F. (149° C.), although the actual melting temperature may vary depending on adhesive manufacturer. To put PUR adhesives to practical use, however, all moisture must be removed from the air within the supply hopper of the adhesive supply unit. To remove moisture, one adhesive supply unit that is presently sold by the assignee of the present invention in Japan solves these problems by removing moisture with a sequenced drying and vacuum purge cycle after the adhesive is introduced into the hopper tank. Moisture removal is achieved by supplying super dry air through a series of dryers or filters designed to remove the moisture.

One of the problems with the above commercial system is that the air control system for removing moisture is mounted on a separate cart that is not a part of the machine per se. In addition to bulkiness and occupying space, lengthy air lines are necessary to pneumatically interconnect the air control system with the machine hopper. In addition to requiring additional space and increasing the number of external parts surrounding the machine, these lengthy air lines increase the valve response times and lengthen the process times for removing moisture.

Other potential drawbacks with the above commercial device exist. For example, the hopper lid used to seal off the adhesive in the hopper from the ambient environment did not always close properly which is critical in order to remove moisture within a pre-determined short amount of time before the PUR adhesive cures. Yet another drawback associated with the above commercial machine was that the actuation of the moisture purging cycle was manually controlled and the time sequence for the purge was manually inputted. One problem with this approach is that the time involved varies as a function of the amount of adhesive in the hopper.

It is accordingly an object of the present invention to integrate the air control components directly onto the adhesive supply machine.

Another object is to minimize the space necessary for the adhesive supply machine and associated air control to occupy on a production floor.

Still a further object of the invention is to incorporate a heavy duty hopper lid and top closure that positively clamps onto the hopper to assure a moisture tight closure.

Yet a further object is to automate the electronic cycling of the air control system so that the cycle automatically starts to remove moisture from the hopper once the lid is closed shut.

A further object is to automatically control the pressure inside the hopper while compensating for the amount of adhesive in the hopper.

SUMMARY OF INVENTION

The adhesive supply machine for supplying polyurethane (PUR) and other adhesives is comprised of a melter body including a hopper having an interior storage region for receiving the PUR adhesive in solid form, and at least one heating element disposed within the hopper for melting the adhesive. The hopper includes an open top that is selectively opened and closed with a lid. When closed, a control system associated with the machine automatically actuates an air control that removes moisture from the air within the hopper in a dryer/purge cycle after the adhesive is introduced. The purge cycle is repetitive for a predetermined number of times in order to replace the moisture-laden air with super dry air while providing a vacuum within the hopper at a predetermined vacuum pressure.

In accordance with one unique feature of the present invention, a unique clamping arrangement is provided to assure positive clamping of a lid base to the hopper to prevent a breach of the seal and the undesirable introduction of ambient moisture laden air into the hopper that will prematurely cause the molten polyurethane therein to cure. To facilitate reliable clamping, a unique clamping bar arrangement is used to secure the lid base directly to the hopper body. This is achieved in the preferred embodiment by clamping the bars directly to the open mouth of the hopper and in turn securing the lid base to the clamping bars with screws.

Another improvement feature of this invention is the integration of an assortment of dryers and filters in an air drying circuit that alternates with a vacuum purge cycle achieved with a vacuum generator to both dry the air within the hopper to within an acceptable range while providing predetermined desired vacuum pressure conditions. The purge cycle is automatically controlled by the control system and is automatically initiated once the lid is latched closed as detected by a sensor associated with a lid position switch. The sensor is preferably an optical sensor, instead of a mechanical sensor, which results in reduced weight and costs.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications and various obvious respects, all without departing from the invention. Accordingly, the description is to be regarded as illustrated in nature, and not as restricted.

BEST MODE FOR CARRYING OUT THE INVENTION

Figure 1:
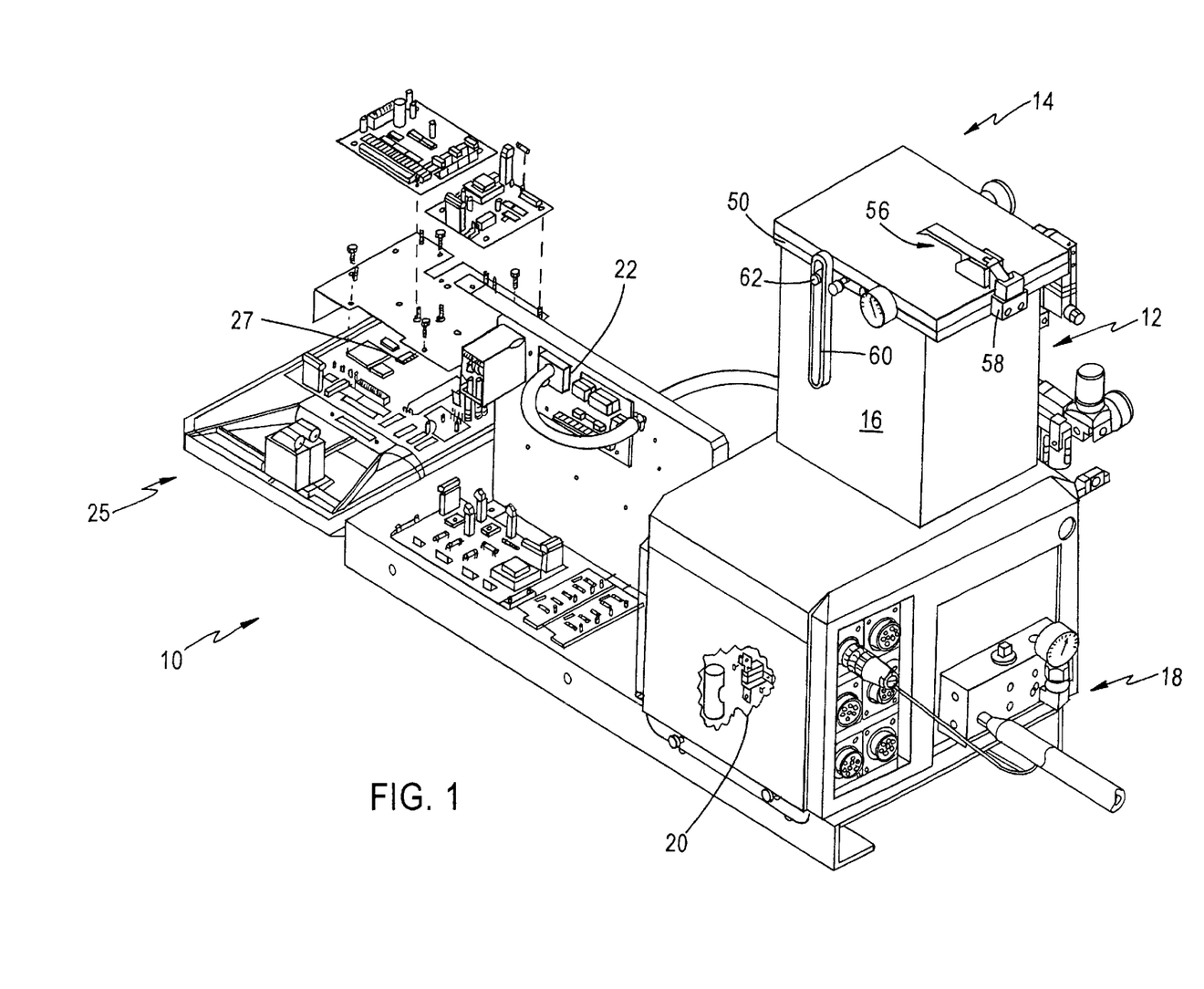
FIG. 1 is a perspective view of the adhesive supply unit in accordance with a preferred embodiment of the present invention.

Referring to the drawing, FIG. 1 is an illustration of a material melting and dispensing apparatus 10 having a material hopper 12 adopted to be closed with a hopper lid 14 in an air tight manner. The hopper 12 is mounted within a melter body 16. Solid and quasi-solid material to be melted, such as hot melt polyurethane adhesive (PUR), is added to the hopper 12 through the open lid 14. Heat is supplied to heating elements (not shown) within melter body 16 in a known manner. The melted material is drawn through a shut-off valve and filter assembly 18 and is subsequently pumped by a pumping mechanism to a demand location. Feedback is provided by temperature sensing assembly 20 and a pressure sensor board 22 and control of the process is maintained by a control panel 25 in which control parameters are programmed onto an Eprom chip 27. In accordance with the unique features set forth below, the adhesive supply unit 10 of the invention is outfitted with a novel pneumatic control system 30 and a sealed lid with heavy duty clamping lid handles that assure a moisture tight closure. The lid assembly is interconnected to the control panel 25 to automatically initiate the dehumidification of air within the supply hopper 12 to prevent curing while also maintaining the pressure within the hopper to a programmed level.

Figure 2:
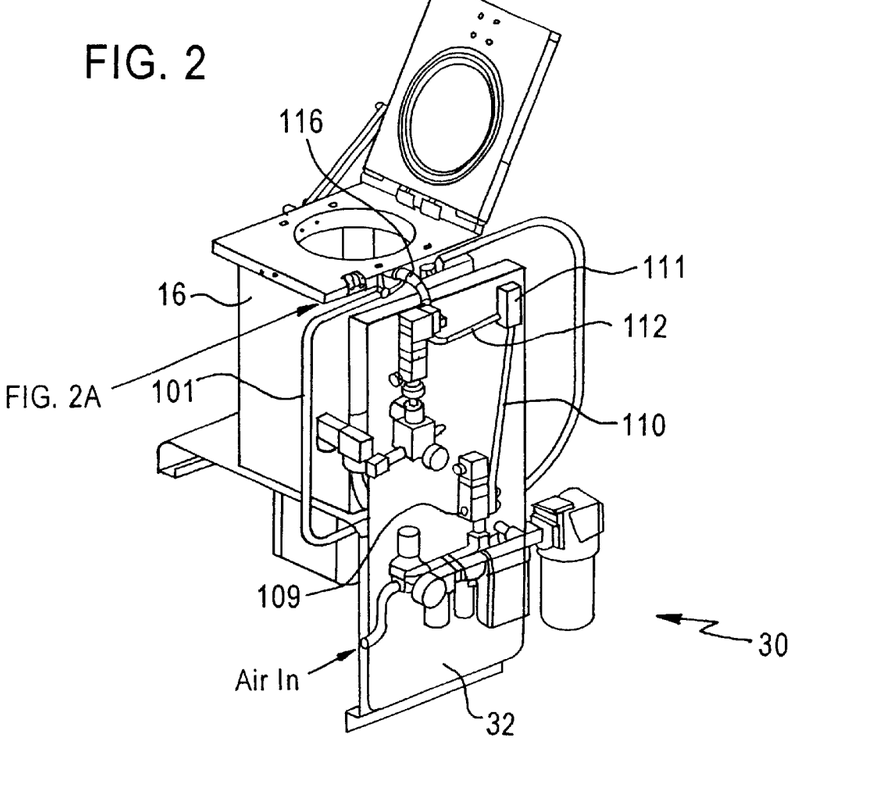
FIG. 2 is a perspective view of the air control system for dehumidifying and controlling the air pressure within the hopper tank.
Figure 2A:
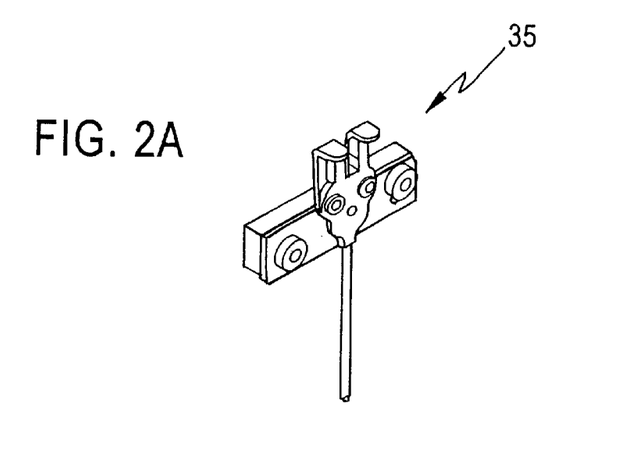
Figure 3:
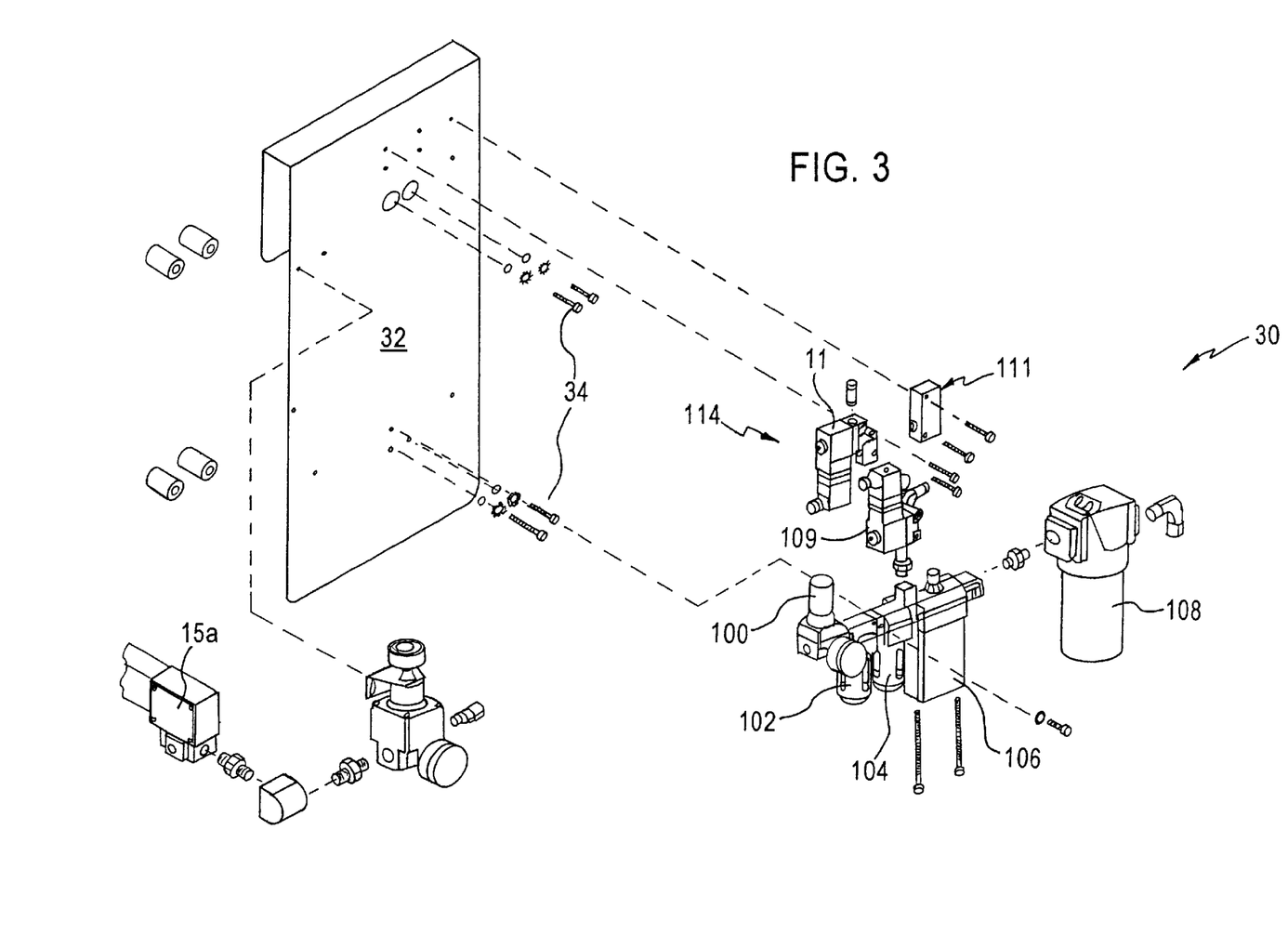
FIG. 3 is an exploded perspective view of the air control system of FIG. 2.

In accordance with one unique feature of this invention, the entire air control system 30 is mounted on a panel 32 that is bolted to the machine (e.g. the melter body 16 as depicted in FIGS. 2 and 3) with bolts 34, eliminating the need for the mounting of a separate air control system on a separate cart. As will be seen more fully below, the cycling of the. air within-the hopper 12 to dehumidify and maintain appropriate pressure automatically occurs by means of a lid sensor 35 connected to the eprom chip 27 for actuating the air control cycle 30 when the sensor senses that the lid 14 is fully closed. The lid sensor 35 is mounted with screws 36 to a lid sensor bracket 37 in turn mounted to the upper part of the melter body 16 with a bracket mount 39 and screws 41. In the preferred embodiment, the lid sensor 35 is an optical switch which is adopted to sense the presence of a screw attached to the lid 14 when the lid is clamped shut. Other sensing arrangements are also possible.

Once the lid 14 is detected in the closed position, the control system 25 automatically initiates the process of drying and maintaining the air inside the hopper 12 at appropriate pre-programmed levels. Initially, with reference to FIGS. 3 and 6 compressed air from an external plant air source (preferably within a pressure range of 60–85 PSI) is supplied to the air control system 30 through an input regulator 100 that is typically set to a predetermined pressure of 80 PSI. The air passes from input regulator 100 through a mist separator 102 that removes oil from the air. The air then enters a micro mist separator 104 which removes water, followed by passage through a membrane filter 106 that removes any remaining water molecules before going through a desiccant filter or dryer 108 which dries the air to a predetermined dew point temperature (e.g. minus 40° C.).

Figure 6:
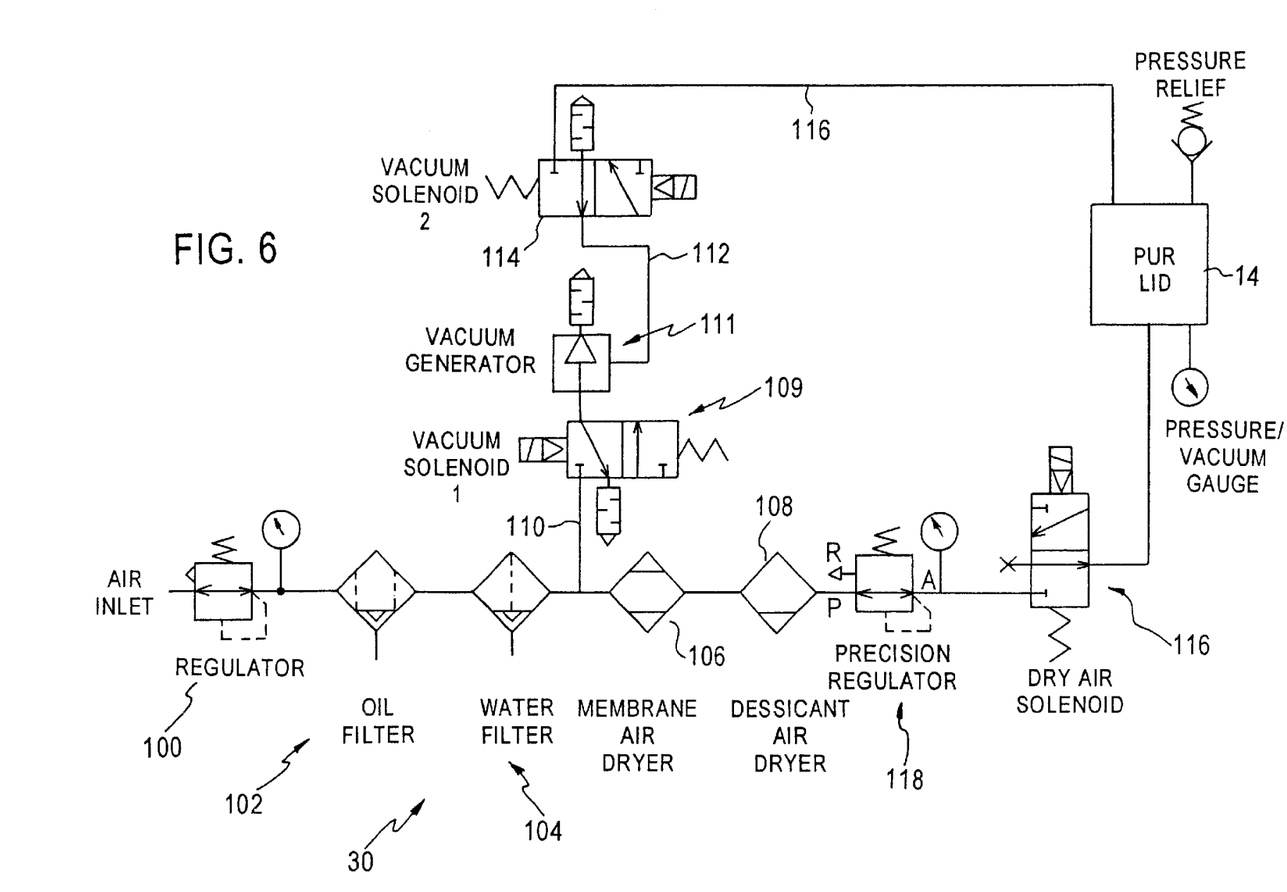
FIG. 6 is a pneumatic diagram of the air control cycle of the air control system used in the present invention.

Before the air reaches the membrane dryer 106, there is situated a solenoid controlled air valve 109 that can be opened to initiate the vacuum cycle by tapping off a part of the air flow and directing it to a vacuum generator 111 through a branch line 110. The air flowing through vacuum generator 111 creates a Venturi effect that creates suction within a line 112 leading to a second air valve 114 that is also open and communicating with the hopper interior through a line 116 to pull a vacuum from inside the hopper. Once a vacuum is pulled down to a preset level (e.g. minus 20 inches), the first and second valves 109 and 114 are closed with the control system 25 to stop the vacuum cycle. At this point, another solenoid controlled valve 116 operatively attached to a second low pressure precision regulator 118 located downstream from the desiccant filter 108 is opened so as to pump dry air into the hopper 12 until a predetermined pressure level (e.g. 7 PSI) is attained. Once this occurs, this valve 116 is closed and the foregoing cycle is repeated.

By removing air within the hopper interior in the purge cycle, alternated with the pumping of dry air into the hopper 12 in the manner described above, the overall repetitive effect is to gradually replace the moisture laden ambient air within the hopper (occurring when the hopper lid 14 is open) with dry air with sufficiently low humidity so as to prevent undesirable curing of the solid or molten adhesive within the hopper. As mentioned above, the purge cycle is automatically controlled with the control system 25 and utilizes a pressure transducer (instead of relying on the use of timers) to assure sufficient purging and dehumidification, independent of the quantity of adhesive actually in the hopper. In practice, it has been found that five alternate automatically controlled cycles is sufficient to sufficiently dry the air within the hopper 12. This arrangement also avoids the use of nitrogen based systems as known in the prior art.

The use of a pressure transducer or sensor for monitoring pressure inside the hopper 12 can also be used to signal if there is a leak in the hopper.

Once the repetitive cycles are completed, the dry air within the hopper 12 is maintained at approximately 7 PSI with the second precision regulator 118 to create a slight over pressure that prevents ambient air from entering the hopper through the lid 14.

Figure 4:
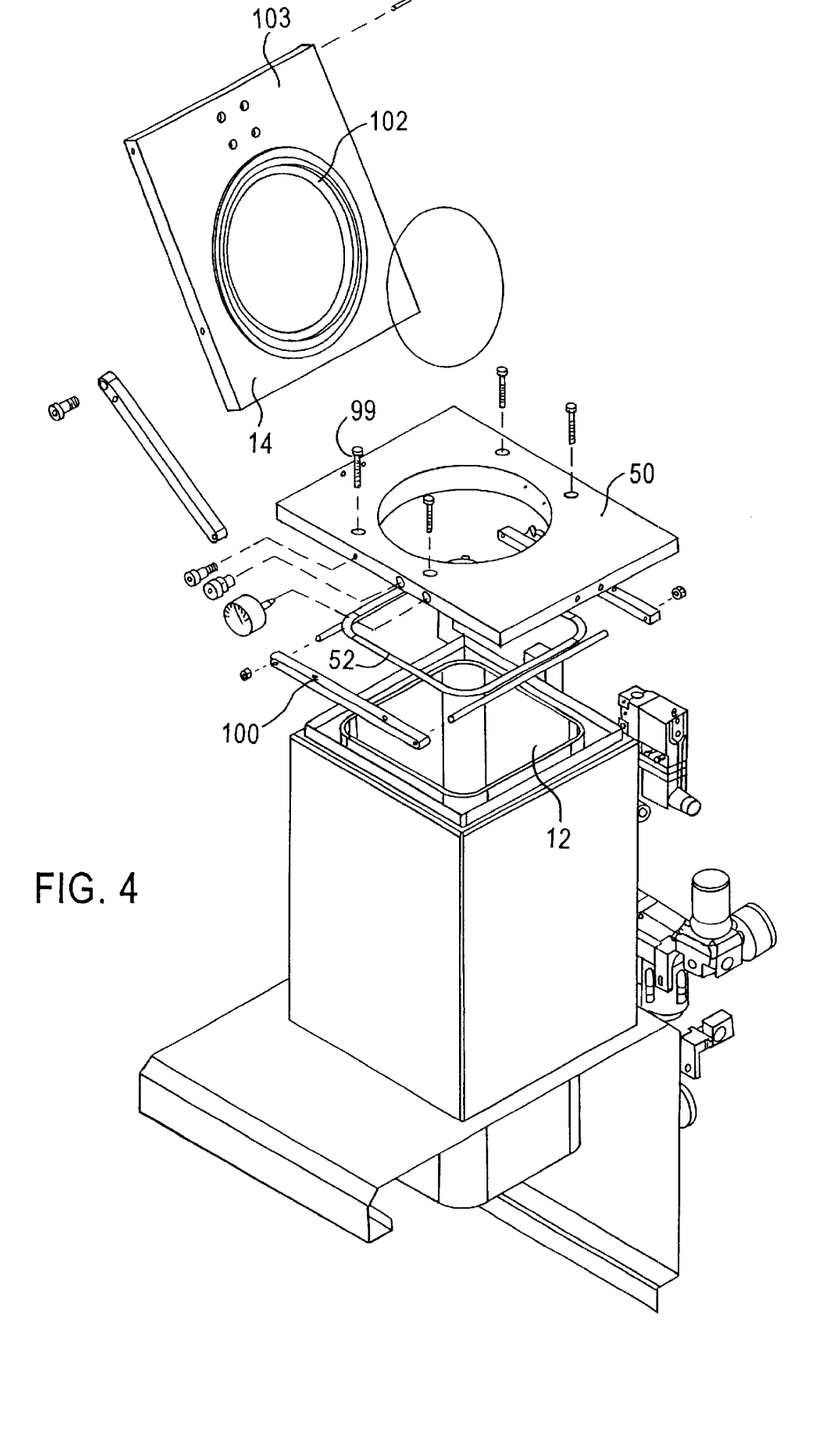
FIG. 4 is an exploded perspective view of the supply hopper and clamping lid in accordance with another feature of this invention.

The hopper 12 is disposed within the melter body 16 through an open top that is closed with a lid base 50 as best depicted in FIG. 4. An O-ring 52 placed between the bottom surface of the base 50 and the upper edge of the hopper 12 provides an air tight seal between the hopper and the base. The lid 14 is attached to the lid base 50 by means of hinge assemblies 54, while one or more latch assemblies 56 at the opposite end of the lid 14 are operable to engage a latch-mounting block 58 secured to the lid base 50 in the closed position such as depicted in FIG. 1. The lid 14 may be maintained in its open position by means of a lid brace 60 formed with an elongate groove which engages a guide screw 62 on the side of the lid base 50 that controls the movement of the brace as the lid 14 is pivoted to the closed position.

Figure 5:
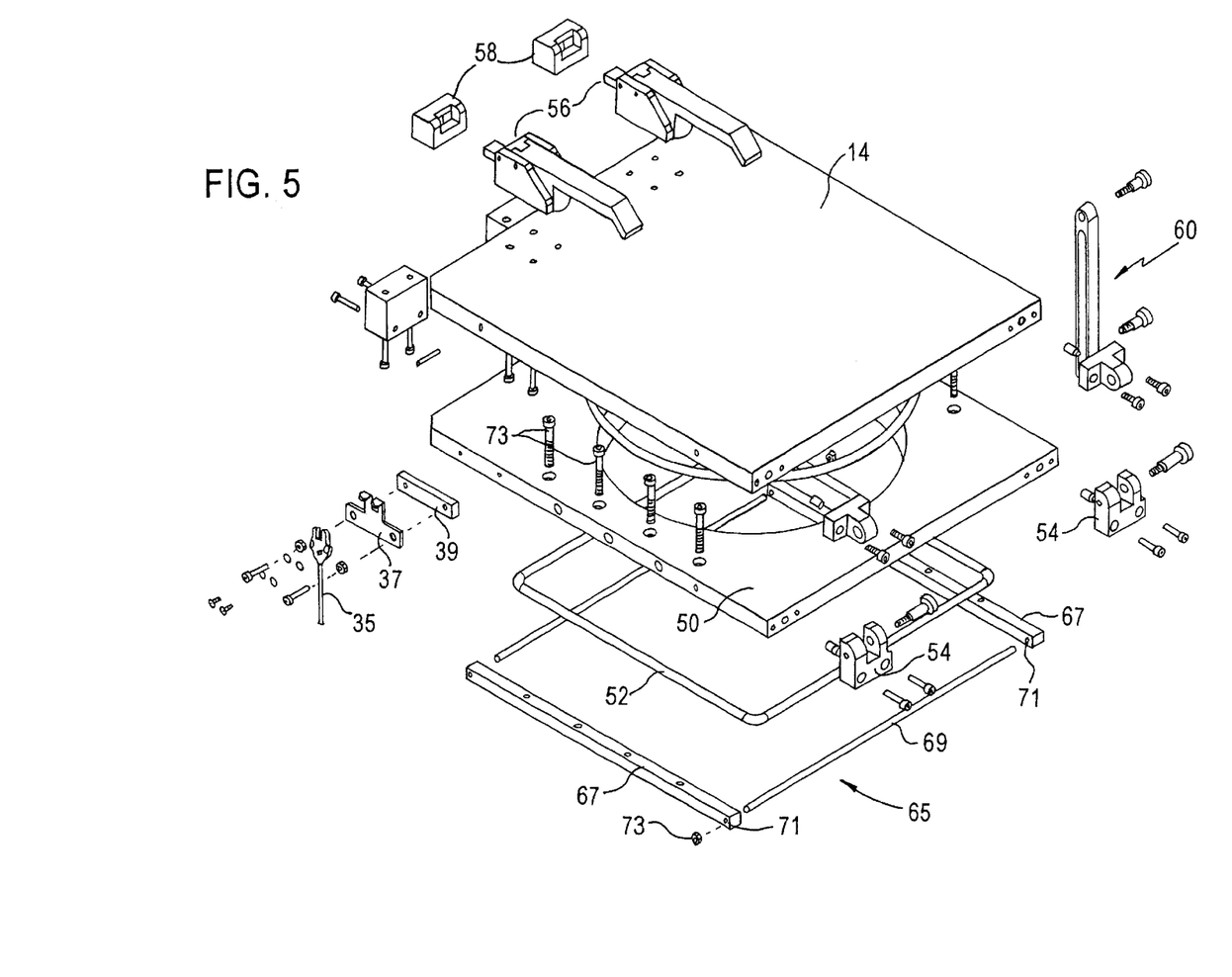
FIG. 5 is an exploded perspective view of the lid base and clamping mechanism of FIG. 4.

In accordance with another feature of this invention, a unique clamping mechanism 65 is used to clamp the lid base 50 to the hopper 12 to stabilize the O-ring seal 52 between the lid base and the lid. In the preferred embodiment, a pair of parallel bar clamps 67 (see FIGS. 4 and 5) are located along a pair of opposite sides of the hopper 12 and are clamped to exterior surfaces adjacent the upper edge defining the hopper mouth by means of a pair of threaded studs 69 extending through openings 71 at opposite ends of each bar clamp. Tightening nuts 73 threadedly secured to the ends of the studs 69 passing through the associated bar clamp ends are tightened to securely clamp the bars against the hopper sides. The lid base 50 is then bolted to the bar clamps 67 with screws 73 to assure a tight connection between the hopper 12 and lid base.

The adhesive supply unit 10 according to the present invention, as mentioned above, utilizes a software based control system 25 to automatically initiate the air drying/purge cycle each time the lid 14 is opened and then closed in the manner described above. The control system 25 also includes a mechanical over temp thermostat 20 that acts as a safety backup to prevent the hopper temperature from exceeding a predetermined temperature (e.g. 300° F.). If this temperature is exceeded, the over temperature thermostat 20 will cause the circuit breaker of the adhesive supply unit 10 to open and power to the hopper 12 and all hoses and heads will be shut down. The mechanical thermostat preferably must be manually reset after the hopper temperature falls below 50° from the cut-off temperature.

The control system panel 25 of the adhesive supply unit 10 of the invention gives the user special prompts, alarms and messages to aid in safe operation. For example, the user can program a length of time during which the controller 25 will give the operator an alarm warning the operator that the hopper lid 14 is open. The operator can also program a length of time for which the controller 25 will give the operator an alarm warning that there is not a complete vacuum in the hopper 12. Likewise, the operator can program a length of time for which the controller 25 will give the operator an alarm warning that the PUR system is not generating sufficient pressure. These programming options are designed to provide for programming of other predetermined time parameters in lieu of the factory settings.

When using the adhesive system 10 of the present invention, the operator must keep in mind that the hopper lid 14 must remain closed, except for the brief time necessary to replenish the adhesive. This is because PUR adhesives bond quickly and strongly in the presence of moisture. If the PUR adhesive solidifies in the hopper 12, then the hopper must be replaced. When the lid 14 is closed, the adhesive supply unit 10 of the invention will begin cycling as discussed in detail above. The unit 10 will automatically go through five "air purging" and cycles to purge the hopper 12 and adhesive therein of moisture. The controller display 25 provides appropriate displays such as "Air Purging Active 1", "Air Purging Active 2", etc., until it completes "Air Purging Active 5". The air purging process may take as long as ten minutes, depending on the amount of adhesive in the hopper 12 (i.e. the more adhesive in the hopper, the less time the process will take since less air occupies the interior).

The operator must allow for adequate time (typically 20–30 minutes) for the adhesive to melt to the temperatures of the temperature zones to stabilize. The controller display 25 features "H" (heating) and "R" (ready) settings. The control system 25 and display may also be programmed so that a "undertemp" arrow will blink until an LED indicative that the temperature zones are up to ready temperature blinks when the temperatures are ready. At that point, a motor (not shown) is enabled to pump adhesive in a known manner. If the motor is in an auto program mode, adhesive will begin to pump when the production line begins to operate. If the motor operates in a manual mode, then adhesive will be available for pumping once the operator actuates the motor.

During operation of the adhesive supply unit, the controller display 25 is programmed with the following alarms that require the operator to take action:

| | |
|---|---|
| Close Hopper Lid!<br>Set - - Act - - | → Close the hopper lid 14. If hopper lid 14 is not closed within the programmed time delay, the following alarm message will be displayed. After lid 14 is closed, the system will begin its Air Purging cycling. |
| Close Hopper Lid!<br>Pressure Error! | → This alarm message alerts the operator that the pressure in the hopper 12 has fallen. Close hopper lid immediately! After lid 14 is closed, the system will begin its Air Purging cycling. |
| Vacuum Error<br>Set - - Act - - | → Troubleshoot for a vacuum leak. Problem may be due to 1.) a faulty hopper lid seal, 2.) faulty pneumatic hose or fitting, 3.) the programmed time delay is too short, etc. |
| Vacuum Error<br>Quit with (C) | → Press C to clear error. Continue to troubleshoot for a problem in the vacuum system. Purge cycle re-starts. |
| Pressure Error<br>Set - - Act - - | → Troubleshoot for a pressure leak. Problem may due to 1.) unit is not getting up to pressure, 2.) the programmed time delay is too short, etc. |
| Pressure Error<br>Quit with (C) | → Press C to clear error. Continue to troubleshoot for a problem in the pressure system. Purge cycle re-starts. |
| Low Tank Level<br>Press C to Clear | → Press C to clear. Open lid and add adhesive to hopper. See complete instructions below. |

In summary, the adhesive supply unit 10 of the present invention contains numerous improvements discussed above that are designed to assure that the adhesive supply hopper 12 has a moisture tight closure and that moisture is automatically and quickly purged from the hopper interior to enable long and reliable operation. The pneumatic diagram (FIG. 6) and exploded view component perspective view illustrations in conjunction with the written description, are sufficient to enable persons skilled in this art to practice this invention as defined by the claims herein.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. An apparatus for melting solid and quasi-solid materials, comprising;
   a.) a melter body including a hopper having an interior space for receiving said material add at least one heating element operatively connected to melt said materials;
   b.) a lid operatively connected to close the hopper in an air tight manner;
   c.) an air control system including a first loop in operative communication with the interior space through a first valving arrangement and including at least one of a vacuum pump and vacuum generator for removing air from said interior space; and a second loop in operative communication with the interior space though a second valving arrangement and containing at least one dryer filter for removing moisture from a source of air and including an outlet for discharging the dried air into the interior space; and
   d.) a control system operatively connected to the air control system for alternately actuating the first and second valving arrangements to operate the first and second loops to withdraw moisture laden air from the interior space and replace it with dried air.

2. The apparatus of claim 1, wherein said control system automatically alternately actuates said first and second loops a plurality of number of times.

3. The apparatus of claim 2, wherein said control system automatically actuates said first and second loops in alternate sequence five (5) times.

4. The apparatus of claim 1, further comprising a sensor operatively mounted between the lid and melter body to since when the lid is closed in said air tight manner, said control system operatively connected to said lid sensor to automatically initiate said first and second loops in an alternate sequence.

5. The apparatus of claim 4, wherein said control system automatically operates said first and second loops in alternating sequence for a predetermined number of times.

6. Apparatus of claim 5, further comprising a pressure sensor operatively mounted to sense pressure within the interior space, said control system being operatively connected to said pressure sensor to actuate each of said first and second loops for a period of time until a predetermined pressure condition is attained within said interior space.

7. Apparatus of claim 1, wherein said air control system is mounted directly on a panel that is directly mounted to the melter body.

8. Apparatus of claim 1, further comprising a lid base mounted to an upper open end of the hopper which defines a hopper mouth into which material is placed in said interior space, said lid being hinged to said lid base; and a clamping assembly arranged to apply clamping pressure to opposing sides of said hopper, and fasteners arranged to fasten the lid base to the clamping assembly to securely mount the lid to the hopper.

* * * * *